Patented Feb. 18, 1930

1,747,604

UNITED STATES PATENT OFFICE

KARL SCHÖLLKOPF, OF DUSSELDORF-OBERKASSEL, GERMANY

PROCESS FOR OBTAINING TOLUOL AND PROPYLENE FROM CYMOL

No Drawing. Application filed February 28, 1929, Serial No. 343,547, and in Germany March 12, 1928.

The present invention relates to a process for obtaining toluol and propylene by breaking down cymol.

It is known that the isopropyl group of the cymol can be split off by pyrogenetic decomposition. Apart from the fact that in this way numerous by-products are formed which make it difficult to obtain pure toluol and that, owing to the protracted purification necessary, the process is economically unusable, the yields obtained also are by no means satisfactory.

Other known processes for splitting off the isopropyl group from cymol, owing to the stability of the cymol, depend on the use of highly reactive agents such as aluminium chloride, aluminium bromide or hydriodic acid.

Apart from having a strongly acid reaction these methods have the disadvantage of forming considerable quantities of undesired by-products, as the reaction does not stop at the splitting off of the propylene but, by also causing the methyl group to become partly detached and the side chain radical to be again attached to the nucleus, as well as by condensation of the alkyl radicals with one another, leads to a mixture of various aromatic and aliphatic hydrocarbons.

The surprising fact has now been found that cymol is readily split up into toluol and propylene by a suitable treatment with activated bleaching earths. The words "activated bleaching earths" are used to designate hydrated silicates (so-called "hydrosilicates"), particularly free silicic acid-containing aluminium hydrosilicates. The activated bleaching earths are obtained from the naturally occurring bleaching earths or similar hydrosilicates, such as clays and kaolins, by treating the same with acids, for example with hydrochloric acid.

The primary reaction, i. e. the decomposition of the cymol into toluol and propylene, proceeds extraordinarily rapidly in the presence of activated bleaching earths as catalysts at temperatures of from 300° C. to 450° C. and under normal pressure, whereas the undesired secondary reactions, i. e. the re-attachment of the propylene to any benzol hydrocarbons present, as well as the polymerization of the propylene with the formation of benzine, take place so slowly under the conditions chosen that only a small portion of the propylene escapes isolation.

A particular advantage of the new process is to be found in the fact that it is possible with its aid to convert the large supplies of otherwise scarcely utilizable cellulosic cymol into toluol and propylene, as the bleaching earths, as well as being cheap are surprisingly permanent in their activity in spite of the presence of strong catalyst poisons in the sulphite cymol.

*Examples*

1. 100 parts by weight of p-cymol are passed at 420° C. over a commercial bleaching earth, for example, "tonsil". 60.5 parts (89% of theory) of toluol having a specific gravity at 15° C. of 0.867, 10 parts of cymol, 1.6 parts of saturated hydrocarbons of boiling point 50°–150° C. and 2 parts of hydrocarbons of boiling point above 180° C. are obtained from the portions condensed by the cooling water. The hydrocarbons which are not condensed (25 parts of the whole) contain 19.6 parts of propylene (62% of theory). It is identified by being converted into dibromo-propane which boils sharply at 140°–141° C.

2. 100 parts by weight of technical sulphite cymol (95%) are passed at 350° C. over a Florida earth activated by a treatment with concentrated hydrochloric acid in the hot. The condensate contains 56 parts (85% of theory) of toluol, having a specific gravity at 16° C. of 0.865, 9 parts of very pure cymol, 1.2 parts of hydrocarbons boiling at 50°–150° C., 2 parts of hydrocarbons boiling above 180° C. to 200° C. and 5 parts of residue. The gases contain 18 parts of propylene (60%) which can be determined as dibromo-propane, and 7.9 parts of saturated hydrocarbons.

What I claim is:—

1. A process for obtaining toluol and propylene from cymol which consists in catalytically treating cymol with activated bleaching earths.

2. A process for obtaining toluol and propylene from cymol which consists in catalytically treating cymol with aluminium hydrosilicates containing free silicic acid hydrate.

3. A process for obtaining toluol and propylene from cymol which consists in catalytically treating cymol with activated bleaching earths at temperatures of from about 300° C. to 450° C. and under atmospheric pressure.

4. A process for obtaining toluol and propylene from cymol which consists in catalytically treating cymol with aluminium hydrosilicates containing free silicic acid hydrate at temperatures of from about 300° C. to 450° C. and under atmospheric pressure.

5. A process of decomposing cymol comprising the steps of passing cymol at temperatures of from about 300° C. to 450° C. and under atmospheric pressure over activated bleaching earths, separating the reaction products by cooling into toluol and other condensable by-products on the one hand and propylene and other gaseous saturated hydrocarbons on the other hand.

6. A process of decomposing cymol comprising the steps of passing cymol at temperatures of from about 300° C. to 450° C. and under atmospheric pressure over aluminium hydrosilicates containing free silicic acid hydrate, separating the reaction products by cooling into toluol and other condensable by-products on the one hand and propylene and other gaseous saturated hydrocarbons on the other hand.

In testimony whereof I affix my signature.

KARL SCHÖLLKOPF.